2,880,184
Patented Mar. 31, 1959

United States Patent Office

2,880,184

METHOD OF DISPERSING RUBBERY POLYMERS IN AQUEOUS MEDIA

James H. Groves, Lombard, and Daniel J. Lenane, Elmhurst, Ill., assignors to American Can Company, New York, N.Y., a corporation of New Jersey No Drawing. Application July 20, 1954
Serial No. 444,654

5 Claims. (Cl. 260—3)

This invention relates to a method of dispersing rubbery polymers and more specifically refers to a method of dispersing solid or dry natural and synthetic rubbery polymers in water, using methyl cellulose as a dispersing agent and to stable water dispersions of such rubbery materials which, on drying, are resistant to redispersion by hot water or steam.

This application is a continuation-in-part of our copending application Serial No. 196,358, filed November 17, 1950, now Patent 2,692,245.

An object of the invention is the provision of a method of dispersing rubbery solids in water without the use of alkali soaps.

Another object is the provision of a method of dispersing solid rubbery materials in water, using methyl cellulose as a dispersing agent.

Another object is providing a method of making a stable dispersion of a rubbery polymer in water in which the dispersed material has a very fine particle size.

Still another object is providing a method of making a stable dispersion from which moist heat and fat resistant compounds may be formed.

Numerous other objects and advantages of the invention will be apparent as it is better understood from the following description which is a preferred embodiment thereof.

Water dispersions of rubbery polymers heretofore were made by working the polymer with an alkali soap solution and/or other water soluble wetting agents until the particle size of the rubbery material was sufficiently small to remain in suspension. In most instances addition of a protective colloid such as protein is needed to keep the particles in a colloidal state. Natural rubber latex must be protected with an alkali soap to prevent coagulation. The naturally occurring proteinaceous materials also serve as protective colloids to retard coagulation of the rubber particles.

Sealing or gasket compounds for ends of containers or container joints formed by mixing a solution of high viscosity methyl cellulose and a natural latex or synthetic rubber dispersion are old in the art, as disclosed in Nagle et al., Patent No, 2,427,618. Methyl cellulose is unique in its solubility behavior in that it is fairly soluble in cold water but gels on heating. Nagle et al. employed this property in an attempt to provide a composition that was resistant to moist heat. However, this was unsatisfactory for the reason that although the methyl cellulose would coagulate when subjected to moist heat of about 120° F. or above, the soaps, proteins or other protective colloids in the sealing compositions are reactivated when exposed to such conditions, so that at least a partial dispersion of the rubbery materials is effected and thus the sealing qualities of the lining are seriously impaired.

Canning practices developed in recent years require a sealing effectiveness at temperatures ranging from about 190° F. to about 212° F. or even higher in some cases. In addition to being resistant to moist heat, the compound in many instances must also be resistant to animal and vegetable fats and to certain petroleum products. In the past, if one of these resistant characteristics was obtained, it was at the expense of the other. Thus, organic solvent dispersions possess good resistance to moist heat but do not have adequate fat resistance, and water dispersions are normally fat resistant but lack proper resistance to moist heat. We discovered that the compositions prepared by our invention possess resistant qualities to both fats and moist heat and that the viscosity is stable over long periods of storage and also that they are not thixotropic.

The method of forming the dispersions comprises intimately mixing a rubber polymer, methyl cellulose and water along with optional ingredients such as fillers and a tackifying resin for and compatible with the rubbery polymer. If so desired, the dry ingredients may be given an initial working or mastication by any known means, such as a roll mill or a Banbury mixer. This dry mixture may then be transferred to a suitable kneading and dispersing mixer, such as a Baker-Perkins mixer, for the water addition procedure; or the entire process may be carried out in the dispersing mixer. The temperature at which phase inversion from a water in rubber-filler-resin mixture to a rubber-filler-resin in water colloid takes place must be below the gel point of the methyl cellulose.

The dispersion can be made by several variations of incorporating the methyl cellulose into the composition.

(1) A rubbery polymer, natural, synthetic or a compatible combination thereof is worked or masticated for a few minutes on a roll mill, in a Banbury or a Baker-Perkins mixer. Inert filler, pigment, other solid additives and dry methyl cellulose are added in increments with continued mixing until the ingredients are distributed fairly evenly. If a roll mill or Banbury mixer is used to blend the solid ingredients, the mixture is transferred to a Baker-Perkins mixer at this point. The usual caution not to overheat the dry stock during the mixing operation must be exercised.

A tackifying or plasticizing resin in solution in a volatile organis solvent is slowly added. The preferred resin solvents are those which are also solvents or softening or swelling, i.e. plasticizing, agents for the rubbery polymer. The resin is then thoroughly mixed with the remaining ingredients. Water is added in small increments and the entire mixture is worked or mixed until the moisture is fairly completely absorbed before a subsequent addition of water is made. The mixing procedure produces a considerable amount of frictional heat which is usually more than ample to evaporate all the volatile organic resin solvent before much water has been added. After the removal of the solvent by evaporation, the mixture is cooled below the gelling temperature of the methyl cellulose and maintained below such temperature during the remainder of the time that water is being incorporated into the composition. The cooling can be effected by circulating a cooling liquid through a jacket of the mixer, by adding finely shaved ice in place of liquid water, or, preferably by adding crushed solid carbon dioxide. Obviously, the temperature must not be permitted to drop below the freezing point of the water. A temperature range of from about 35° F. to about 75° F. is preferred, but it can go as high as about 120° F. without adverse results if the water additions are made with sufficient caution.

In the early stages of water addition a colloidal dispersion or solution of water in the rubber-filler-resin mixture is formed. When a water concentration of from about 18 to about 23 percent by weight of compound is reached, there is a fairly rapid phase inversion, so that water becomes the continuous phase and the rubberfiller-resin mixture is the disperse phase. At this point caution must be used and water must be added with great care to prevent coalescence of particles. Otherwise, agglomeration may become so great that sedimentation may occur when the compound is diluted to proper lining concentrations and viscosity. When a water concentration of about 40% is reached, the dispersion is removed from the Baker-Perkins mill and subjected to rapid stirring to break up agglomerates. While stirring, water is also added to the desired solids concentration. The water addition requires from about 20 minutes to about an hour, depending on the ease of dispersibility of the polymer, the size of the batch being prepared and the efficiency of mixing.

Among the rubbery polymers that can be used are natural rubber, polychloroprene (neoprene), butylene polymers, butadiene polymers, isobutylene polymers, butadiene-styrene copolymers, copolymers of isobutylene and isoprene (Butyl rubber), copolymers of butadiene and acrylonitrile, and copolymers of butadiene, styrene and acrylonitrile. Butadiene-styrene copolymers having a butadiene content of from about 50% to about 95% and a styrene content of from about 5% to about 50% were successfully dispersed. The butadiene-acrylonitrile copolymers can contain from 15% to 45% acrylonitrile and the remainder butadiene. Butyl rubber contains from 1% to about 3% of isoprene, the remainder being isobutylene. Any natural or synthetic rubber polymer can be dispersed by this method.

In order to form the stable dispersion by the method of the present invention, it is necessary that the rubbery polymer be in a softened, cohesive state, i.e. plasticized. This plasticizing of the rubbery polymer may be accomplished by admixing therewith the tackifying resin or the volatile organic liquid swelling agent for the rubbery polymer or both. The heat generated due to friction in the mastication or working of the rubbery polymer also has a plasticizing effect on the rubbery polymer.

The fillers which are suitable are various clays such as hard and soft types kaolins, aluminum silicate, buca clay, calcium carbonate, diatomaceous earth, and zinc oxide. The last is preferred because it has a reenforcing effect on rubbery polymers which is not possessed by the clays. Other fillers can be used providing they themselves do not act as water-dispersing agents with respect to rubber. These can be used singly or in any combination or may be omitted if desired.

As tackifying or plasticizing resins for the rubbery polymer, rosins and rosin derivatives having an acid number above 10 and water insoluble metal resinates of the same are preferred. Included in these rosins and rosin derivatives are hydrogenated rosin, gum rosin, polymerized rosin, dehydroabietic acid, disproportionated rosin, rosin treated with soda ash, rosin and rosin esters modified with a phenolic compound, resinous terpene-hydrogenated rosin coesters and resinous terpene polybasic acid-rosin coesters. Zinc salts, aluminum salts and calcium salts of the above rosins and rosin derivatives are examples of metal resinates found to be particularly useful in the present invention. Beta-pinene and other pinene polymers, coumarone-indene polymers and organic solvent soluble phenol aldehyde resin, phenol cashew nut oil resins and aldehyde cashew nut oil resins capable of being converted catalytically to insoluble resins are also useful. Any resin which has adhesive qualities and which is compatible with rubber and soluble in a rubber softening or swelling solvent is useful. It is desirable that the melting point of such tackifying resin be above 212° F. or else that it be capable of conversion to attain such characteristics, so that it will not melt when exposed to the temperature of steam at atmospheric pressure. However resins melting as low as 160° F. are also operable in forming a dispersion according to the present invention where the final product is not subjected to excessively high temperatures. The resins can be used singly or in any compatible combination. If desired the tackifying resins can be omitted entirely.

Solvents for resinous tackifiers and rubber softeners are Skellysolve B which is a petroleum fraction having a boiling range of 140°–160° F., Skellysolve C, another petroleum fraction with a boiling range of 186°–212° F., methyl ethyl ketone, methyl isopropyl ketone or any other relatively low boiling organic solvent capable of dissolving the tackifying resin and softening the rubbery polymer. These solvents may also be omitted if desired.

Methyl cellulose may be in the form of linters or powder and the useful types have viscosity grades ranging from 100 to 1500 centipoises. Blends of the various grades are satisfactory. In general a slightly higher concentration of low viscosity grade methyl cellulose is required than of the high viscosity to effect dispersion of a given polymer.

Other additives are desirable but not necessary. From 0.3 to 1.0% of an antioxidant, such as Age Rite White, which is symmetrical di-beta-naphthyl-para-phenylenediamine, can be used. Other well known rubber antioxidants may be substituted. Pigments, such as titanium dioxide and carbon black in concentrations up to 8.0 and 0.15% respectively, are also of value to facilitate inspection of lined container ends, but they may be omitted if a clear film is desired.

Several other methods, hereinafter described, can be used to incorporate the methyl cellulose into the mixtures to form a water dispersion of a rubbery polymer. In all these methods the ingredients mentioned heretofore have exactly the same use and function and the phase inversion takes place at concentrations of about 18% to 23% water. The only essential ingredients are the rubbery polymer, methyl cellulose and an aqueous medium. The aqueous medium can consist of water alone, of methyl cellulose in water solution, of an emulsion of methyl cellulose, water and a volatile organic solvent for the tackifying resin, or an emulsion of methyl cellulose, water, resin solvent and tackifying resin.

(2) Another method is to blend the rubbery polymer, and filler, anti-oxidant and pigment, if desired. These solids may be worked or masticated on a roll mill or in a Banbury mixer. After the ingredients are fairly well distributed and the rubbery polymer plasticized by the heat of friction, they are transferred to a Baker-Perkins mixer, and cooled to a temperature below the gelation point of methyl cellulose. A water solution of methyl cellulose is added to the solids in increments with continued mixing. Slow cautious additions of methyl cellulose solution are made and the temperature of the mix is controlled, until a permanent phase inversion occurs. At such time the rubber, and other non-soluble solids if added, are finely dispersed in the water and remain in suspension, after dilution, to a total solids content of 15 percent.

A portion of the methyl cellulose can be mixed in with the solid ingredients on a roll mill and the remainder added as a water solution, or all the methyl cellulose can be worked into the rubber and water added slowly.

(3) The incorporation of the methyl cellulose into the solid ingredients can be made by first blending rubber and other optional solids, such as inert fillers, anti-oxidant and tackifying resins. This blend of solids is then transferred to a Baker-Perkins mixer. A suspension of dry methyl cellulose, in a volatile organic solvent which dissolves the resin and swells and softens, i.e. plasticizes, the rubbery polymer, is added to the solids blend. The resultant mixture is worked or masticated for a few minutes to distribute the methyl cellulose, swell the rubber and dissolve the resin. If the temperature is too high the mixture is cooled below 120° F. and the water is added in increments, with through mixing between each such addition. The organic solvent evaporates during the mixing period and eventually is essentially removed from the mixture. Continued slow additions of water in small increments results in a permanent phase inversion in which the solids are dispersed in the aqueous medium. If desired a portion of the methyl cellulose can be incorporated as a suspension in a volatile organic solvent and the remainder added as a water solution.

(4) The rubbery polymer, to which may be added optionally a filler, a tackifying or plasticizing resin and other additives, is dissolved or dispersed in a volatile organic liquid softening and plasticizing agent for the rubbery polymer. This solution or dispersion is placed in a Baker-Perkins mixer and the volatile organic solvent is evaporated with the simultaneous addition of dry methyl cellulose and very small amounts of water. The entire mass is mixed and masticated during this phase of the procedure. When the organic solvent is completely removed the temperature is adjusted and maintained below the gelation point of the methyl cellulose. Mixing is continued and additional water is added if necessary to invert the colloidal phase. A portion of the methyl cellulose can be added in the dry state as described and the remainder added as a water solution, and the same end results will be obtained.

(5) A mixture of rubber polymer, filler, and other additives, if desired, are worked or masticated on a roll mill or other mixing device until fair uniformity is attained. The tackifying resin is dissolved in a volatile organic solvent that also acts as a softening and plasticizing agent for the rubber. An emulsion of water, methyl cellulose and the resin solution is made by mixing the ingredients and stirring, preferably with a power operated stirrer, or by passing through a colloid mill. The emulsion is added in small increments to the rubber-filler mixture in a Baker-Perkins mixer. The heat generated by the mixing is usually sufficient to evaporate the resin solvent. If necessary, more water is added to cause an inversion of phase. As in all previous methods, the temperature is held below the gelation point of the methyl cellulose before the phase inversion takes place. All the methyl cellulose can be added in emulsion form or part of the dry cellulose ether can be milled into the rubber-filler mixture and the remainder used to form a resin-organic solvent-water emulsion.

(6) Into a Baker-Perkins mixer is placed a mixture of rubbery polymer and methyl cellulose. The mixture may also contain a filler if desired. This stock is masticated or worked allowing the temperature of the mass to rise to 200°–220° F. To this heated mass is added a tackifying or plasticizing resin having a melting point below 220° F. The resin is added in small increments, and each increment mixed until it becomes homogeneous with the stock. During this resin addition the temperature of the mass must be maintained above the melting point of the resin and the resin addition must be sufficiently slow to permit all small lumps and grains in the mass to be broken up. After all the resin has been added, the mass is cooled and water is added to the mass in small increments. Mastication and working of the mass is continued to disperse the water uniformly throughout the mass. During the water addition the temperature of the mass is reduced to and maintained at 110°–130° F., well below the gelation point of the methyl cellulose. Cooling may be accomplished by periodically adding crushed solid carbon dioxide (Dry Ice) to the mass. As the mastication and water addition progress, the rubbery mass becomes softer. Water addition is continued until a phase inversion from a water-in-rubber dispersion to a rubber-in-water dispersion takes place.

These examples show that there are numerous ways of incorporating the methyl cellulose into the rubber polymer to effect a dispersion of the latter in water, and that regardless of the method of incorporating the cellulose ether, a stable water dispersion of rubber is formed.

In can sealing gaskets or compounds, fillers and resins are generally employed to enhance the properties and/or reduce the cost of the compound per unit. The proportions of the ingredients that may be used is tabulated below.

In Table I the preferred and practical ranges of rubbery polymer, tackifying resin and methyl cellulose are delineated.

*Table I*

| Type of Rubber | Preferred Range, percent by wt. of solids | Practical Range, percent by wt. of solids | Tackifying or Plasticizing Resin | Preferred Range, percent by Wt. of solids | Practical Range, percent by Wt. of solids | Methylcellulose (100–1,500 cps.) Preferred Range, percent by Wt. of solids | Methylcellulose (100–1,500 cps.) Practical Range, percent by Wt. of solids |
|---|---|---|---|---|---|---|---|
| Natural | 30–50 | 20–75 | Aluminum, calcium and Zinc Resinates | 25–50 | 0–78 | 3–8 | 2–15 |
|  |  |  | B-Pinene Polymer | 25–35 | 0–78 |  |  |
|  |  |  | Coumarone-Indene Polymer | 25–35 | 0–78 |  |  |
| Butadiene-Styrene Copolymer | 30–50 | 20–75 | Aluminum, calcium and Zinc Resinates | 25–50 | 0–78 | 3–8 | 2–15 |
|  |  |  | B-Pinene Polymer | 25–35 | 0–78 |  |  |
|  |  |  | Coumarone-Indene Polymer | 25–35 | 0–78 |  |  |
| Neoprene | 50–70 | 30–80 | Aluminum, calcium and Zinc Resinates | 25–50 | 0–68 | 4–8 | 2–13 |
|  |  |  | B-Pinene Polymer | 25–35 | 0–60 |  |  |
|  |  |  | Coumarone-Indene Polymer | 25–35 | 0–60 |  |  |
|  |  |  | Phenol cashew nut oil resin | 10–30 | 0–60 |  |  |
| Butylene and Isobutylene Polymers | 40–60 | 30–80 | Aluminum, calcium and Zinc Resinates | 25–35 | 0–68 | 1.25–10 | 1–15 |
|  |  |  | B-Pinene Polymer | 20–30 | 0–68 |  |  |
|  |  |  | Coumarone-Indene Polymer | 20–30 | 0–68 |  |  |
| Butadiene Acrylonitrile Copolymers and Butadiene Styrene Acrylonitrile Copolymers. | 25–45 | 20–75 | Aluminum, calcium and Zinc Resinates | 25–45 | 0–60 | 2–7 | 2–13 |
|  |  |  | B-Pinene Polymer | 5–25 | 0–60 |  |  |
|  |  |  | Coumarone-Indene Polymer | 5–25 | 0–60 |  |  |
|  |  |  | Phenol cashew nut oil resin | 10–30 | 0–60 |  |  |
| Isobutylene Isoprene Copolymers | 30–50 | 20–75 | Aluminum, calcium and Zinc Resinates | 25–50 | 0–68 | 2–7 | 1–15 |
|  |  |  | B-Pinene Polymer | 25–35 | 0–68 |  |  |
|  |  |  | Coumarone-Indene Polymer | 25–35 | 0–68 |  |  |

The optium percentages of zinc oxide as a filler for can sealing compounds ranges between about 4% to about 40% and the practical range is 0% to 70%. Clays, calcium carbonate, diatomaceous earth and other non-reinforcing fillers are used in slightly smaller amounts, so that the optimum range is from about 5% to about 25% and the practical range is from 0% to 60%, regardless of type of rubber used.

The mechanism of the formation of the dispersions is not definitely known, but it is believed to occur in the following manner. Upon mixing all the ingredients, excepting water, the rubber is softened or swelled by any one or all of the plasticizing agents mentioned hereinbefore, i.e. tackifying or plasticizing resin, volatile organic liquid, of heat generated by friction during the working or mastication. The addition of each aliquot of water results in a momentary dispersion of solids of large particle size in water. Within a short while the water is absorbed or emulsified into the solids so that a water-in-rubber emulsion or dispersion is formed. At least a portion of each aliquot of water is available for forming a methyl cellulose solution, which seems to be a very powerful dispersion agent for rubber. The continued mastication and water addition causes the methyl cellulose solution to become thoroughly mixed throughout the entire mass of materials and also forms an increasingly larger volume of methyl cellulose solution. The masticating action reduces the particle size and as the diminution occurs the methyl cellulose layer is formed on the particle of small dimension. The slow, cautious addition of water results in a series of temporary phase inversions. Eventually, when a water content of 18% to 23% is reached, the volume of moisture is greater than that which can be emulsified or dispersed by the rubber. At this stage, the individual particles of rubber are approximately of colloidal dimensions and are coated with methyl cellulose solution, so that on the addition of more water to the mixture the dispersion of rubber in water is completed. The compound is in paste form and in some instances has a considerable amount of rubber having a particle size too great to remain in suspension. Further slow additions of water with mixing further breaks down the particle size of the rubber and results in a composition in which the rubber remains in suspension with remarkably little sedimentation on standing. When this stage has been reached the compound can be readily diluted to lining concentration by the addition of more water. The liquid lining compound may be strained and transferred to the lining equipment or it may be packed for storage.

The compound is applied to container ends in liquid form and then may be air dried or subjected to slightly elevated temperatures up to 190° F.

Our compositions are remarkably easily inverted by slight pressure which converts the gasket from a dispersion to a continuous film of rubbery material in the seaming operation.

In preparing these gasket or lining compositions we have found that dispersions with the finest particles size are formed when the phase inversion occurs at a solids concentration of about 77% to 82%. If the solids content is much higher the composition fails to invert in phase and if they are much lower the particle size is sufficiently great to cause considerable sedimentation on standing.

Specific formulations showing exemplary compositions formed by the methods described follow:

| Ingredients | Percent by weight in dry film | Percent by weight in liquid compound |
|---|---|---|
| Butadiene-Styrene Copolymer | 37.66 | 13.19 |
| Buca Clay | 14.00 | 4.89 |
| Zinc Resinate | 42.20 | 14.77 |
| Titanium Oxide | 1.57 | .56 |
| Methyl Cellulose (400 Cps.) | 4.12 | 1.44 |
| Antioxidant | .37 | .13 |
| Carbon black | .08 | .02 |
| Water | | 65.00 |
| | 100.00 | 100.00 |

Natural rubber can be substituted for the butadiene-styrene copolymer of the above formula.

| Butylene and isobutylene polymers | 47.8 |
| Buca clay | 43.1 |
| Titanium dioxide | 4.8 |
| Methyl cellulose (400 cps.) | 4.3 |
| | 100.0 |

| Neoprene | 58.0 |
| Buca clay | 17.4 |
| Phenol-cashew nut shell oil resin | 11.6 |
| Curing agent | 7.3 |
| Methyl cellulose (400 cps.) | 5.7 |
| | 100.0 |

The curing agent consists of a mixture of 25 parts zinc oxide, 20 parts magnesium oxide, 10 parts phenyl-beta-naphthylamine, 2.5 parts of di-ortho-tolylguanidine salt of di-catechol borate, 2.5 parts of stearic acid and 3 parts of hexamethylene tetramine.

| Ingredients | Percent by weight in dry film |
|---|---|
| Butadiene-acrylonitrile copolymer | 30.2 |
| Thiokol LP2 | 9.0 |
| Phenol-cashew nut shell oil resin | 25.1 |
| Buca Clay | 22.6 |
| Titanium dioxide | 7.6 |
| Antioxidant | 0.9 |
| Methyl cellulose (400 cps.) | 4.6 |
| | 100.0 |

Thiokol LP2 is a normally liquid polythio polymer-captan. A butadiene-styrene-acrylonitrile copolymer can be substituted for the butadiene-acrylonitrile copolymer of the above formula.

| Isobutylene-isoprene copolymer (Butyl rubber) | 47.4 |
| Buca clay | 42.4 |
| Zinc oxide | 4.6 |
| Methyl cellulose (400 cps.) | 5.6 |
| | 100.0 |

In actual application the compounds are liquids which contain from 25% to 50% by weight of solids dispersed in 50% to 75% by weight of water. For most purposes a compound consisting of 30–35% solids and 65–70% water is used.

The rubbery polymer content can vary from about 25% to about 60%, the tackifying resin between 50% and 125%, based on the rubber content, and filler and other additives making up the remainder of the composition. The preferred range of rubber polymer is from 30% to 45% of the solids and that of resin is about a ratio of 1:1 to the rubber.

The composition can also be used as a coating material for paper, cloth or metal articles where a resistance to moist heat and fatty materials is a requisite.

It is thought that the invention and many of its attendant advantages will be understood from the foregoing description, and it will be apparent that various changes may be made in the steps of the method described and their order of accomplishment without departing from the spirit and scope of the invention or sacrificing all of its material advantages, the method hereinbefore described being merely a preferred embodiment thereof.

We claim:

1. A method of forming a stable dispersion of an elastomer in an aqueous medium, said elastomer being selected from the group consisting of natural rubber, polychloroprene, homo-polymers of isobutylene, homo-polymers of conjugated dienes, and copolymers of a conjugated diene and a mono-ethylenically unsaturated monomer, comprising masticating said elastomer in the presence of methyl cellulose as the sole water soluble dispersing agent and a volatile organic liquid swelling agent for said elastomer, evaporating substantially all of said volatile swelling agent from the mass during said mastication, adding about from 18% to 23% based on the total weight of the ingredients of water to the mass in small increments during said mastication to cause phase inversion from a dispersion of water-in-elastomer to a dispersion of elastomer-in-water, and maintaining the temperature of the mass between 35° F. and 120° F. during said water addition.

2. A method of forming a stable dispersion of an elastomer in an aqueous medium, said elastomer being selected from the group consisting of natural rubber, polychloroprene, homo-polymers of isobutylene, homo-polymers of conjugated dienes, and co-polymers of a conjugated diene and a mono-ethylenically unsaturated monomer, comprising masticating said elastomer in the presence of methyl cellulose as the sole water soluble dispersing agent, a plasticizing resin compatible with said elastomer and a volatile organic liquid which is a solvent for said plasticizing resin and a swelling agent for said elastomer, said plasticizing resin being selected from the group consisting of rosin, modified rosin, pinene polymers, coumarone-indene polymers, and organic solvent soluble phenol-aldehyde condensation products, evaporating substantially all of the volatile organic liquid from the mass during said mastication, adding about from 18% to 23% based on the total weight of ingredients of water to the mass in small increments during said mastication to cause phase inversion from a dispersion of water-in-elastomer to a dispersion of elastomer-in-water, and maintaining the temperature of the mass between 35° F. and 120° F. during said water addition.

3. A method of forming a stable dispersion of an elastomer in an aqueous medium, said elastomer being selected from the group consisting of natural rubber, polychloroprene, homo-polymers of isobutylene, homo-polymers of conjugated dienes, and copolymers of a conjugated diene and a mono-ethylenically unsaturated monomer, comprising mixing said elastomer, a filler and a plasticizing resin compatible with said elastomer, said plasticizing resin being selected from the group consisting of rosin, modified rosin, pinene polymers, coumarone-indene polymers, and organic solvent soluble phenol-aldehyde condensation products, masticating the mixture, adding a suspension of methyl cellulose in a volatile organic liquid to the mixture during said mastication, said liquid being a solvent for said plasticizing resin and a swelling agent for said elastomer, adding about from 18% to 23% based on the total weight of ingredients of water to the mixture in small increments during said mastication to cause phase inversion from a dispersion of water-in-elastomer to a dispersion of elastomer-in-water, evaporating substantially all of the volatile organic liquid from the mixture during said mastication, and maintaining the temperature of the mixture between 35° F. and 120° F. during said water addition, said methyl cellulose being the sole water soluble dispersing agent in said dispersion.

4. A method of forming a stable dispersion of an elastomer in an aqueous medium, said elastomer being selected from the group consisting of natural rubber, polychloroprene, homo-polymers of isobutylene, homo-polymers of conjugated dienes, and copolymers of a conjugated diene and a mono-ethylenically unsaturated monomer comprising mixing said elastomer, a filler, a plasticizing resin compatible with said elastomer and a volatile organic liquid, said plasticizing resin being selected from the group consisting of rosin, modified rosin, pinene polymers, coumarone-indene polymers, and organic solvent soluble phenol-aldehyde condensation products and said liquid being a solvent for said plasticizing resin and a swelling agent for said elastomer, masticating the mixture, adding dry methyl cellulose to the mixture during said mastication, adding about from 18% to 23% based on the total weight of ingredients of water to the mixture in small increments during said mastication to cause phase inversion from a dispersion of water-in-elastomer to a dispersion of elastomer-in-water, evaporating substantially all of the volatile organic liquid from the mixture during said mastication, and maintaining the temperature of the mixture between 35° F. and 120° F. during said water addition, said methyl cellulose being the sole water soluble dispersing agent in said dispersion.

5. A method of forming a stable dispersion of an elastomer in an aqueous medium, said elastomer being selected from the group consisting of natural rubber, polychloroprene, homo-polymers of isobutylene, homo-polymers of conjugated dienes, and copolymers of a conjugated diene and a mono-ethylenically unsaturated monomer comprising mixing in substantially dry form said elastomer, a filler and methyl cellulose, masticating the mixture, adding an emulsion of water, methyl cellulose, a plasticizing resin compatible with the elastomer and a volatile organic liquid to the mixture in small increments during said mastication to cause phase inversion from a dispersion of water-in-elastomer to a dispersion of elastomer-in-water, the amount of said added water being about from 18% to 23% based on the total weight of ingredients, said plasticizing resin being selected from the group consisting of rosin, modified rosin, pinene polymers, coumarone-indene polymers, and organic solvent soluble phenol-aldehyde condensation products and said liquid being a solvent for said plasticizing resin and a swelling agent for said elastomer, evaporating substantially all of the volatile organic liquid from the mixture during said mastication, and maintaining the temperature of the mixture between 35° F. and 120° F. during said emulsion addition, said methyl cellulose being the sole water soluble dispersing agent in said dispersion.

References Cited in the file of this patent

UNITED STATES PATENTS

| | | |
|---|---|---|
| 2,076,781 | Jacobsen | Apr. 13, 1937 |
| 2,370,057 | Mack | Feb. 20, 1945 |
| 2,388,601 | Collins | Nov. 6, 1945 |
| 2,427,618 | Nagle et al. | Sept. 16, 1947 |